United States Patent
Jacobs-Cook

[11] Patent Number: 5,991,027
[45] Date of Patent: Nov. 23, 1999

[54] OPTICAL VIBRATION MEASUREMENT SYSTEM

[75] Inventor: Alan James Jacobs-Cook, Birmingham, United Kingdom

[73] Assignee: Lucas Industries plc, United Kingdom

[21] Appl. No.: 09/035,242

[22] Filed: Mar. 5, 1998

Related U.S. Application Data

[63] Continuation of application No. 08/835,810, Apr. 16, 1997, abandoned, which is a continuation of application No. 08/610,386, Mar. 4, 1996, abandoned.

[30]    Foreign Application Priority Data

Mar. 18, 1995  [GB]  United Kingdom .................... 9505516

[51] Int. Cl.⁶ ...................................................... G01B 9/02
[52] U.S. Cl. .............................................. 356/345; 356/352
[58] Field of Search ....................................... 356/345, 352

Primary Examiner—Robert H. Kim
Attorney, Agent, or Firm—Andrus, Sceales, Starke & Sawall

[57]    ABSTRACT

A measuring apparatus comprises a sensor having a vibrating beam whose resonant frequency represents a parameter, such as pressure, to be measured. A light guide supplies light from a source to the beam and returns light reflected from the beam and from the end of the guide to an interferometer. The difference in light paths is greater than the coherent length of the light. The interferometer has first and second paths which differ in length by the difference in the light paths plus an odd number of quarter wavelengths of the light.

4 Claims, 5 Drawing Sheets

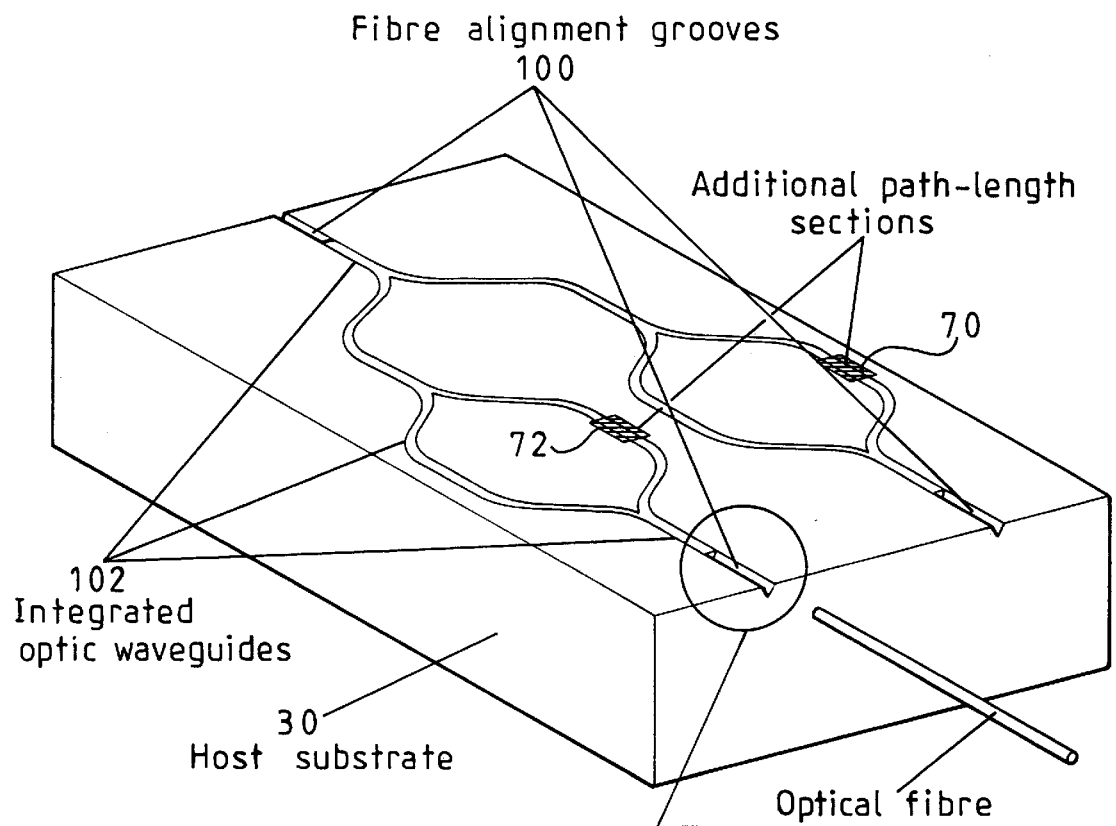
FIG 6
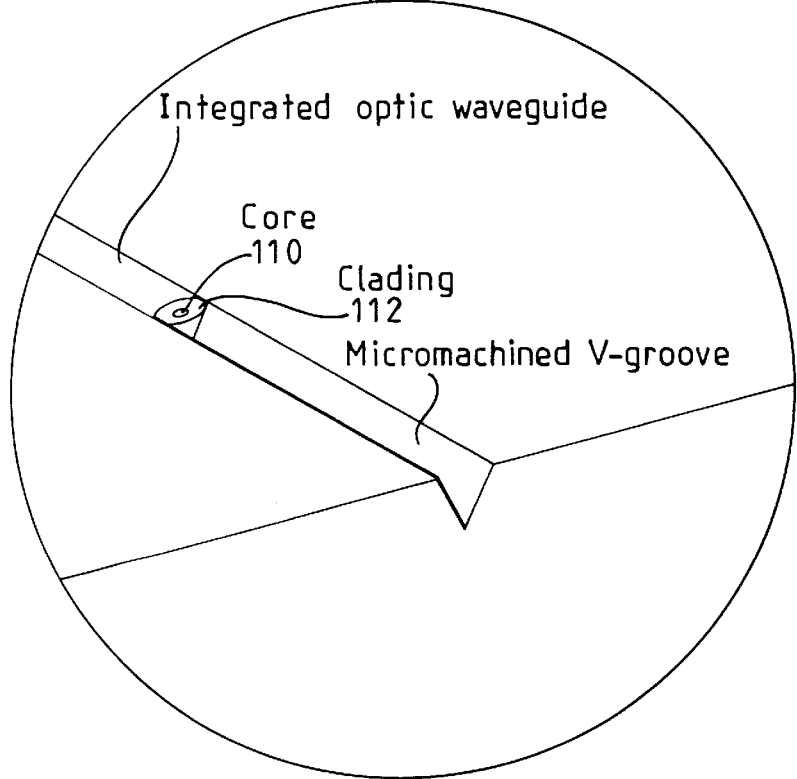

OPTICAL VIBRATION MEASUREMENT SYSTEM

This a continuation of application Ser. No. 08/835/810, filed Apr. 16, 1997, now abandoned, which is a continuation of application Ser. No. 08/610,386, filed Mar. 4, 1996, now abandoned.

The present invention relates to a measuring apparatus.

It is known, for example from GB 2 239 520, that a solid state sensor having a vibrating element whose frequency of vibration varies as a function of a parameter, such as pressure, can be interrogated optically. Such a system is schematically illustrated in FIG. 1 of the accompanying drawings. An optical fibre 2 is arranged to direct light towards a vibrating element 4 supported by a diaphragm 8 of a resonant sensor 1. The optical fibre 2 is also arranged to receive light reflected from the vibrating element 4 and return the light to a measurement system. The vibrating element 4 is positioned within an evacuated enclosure defined within the sensor 1. An end 6 of the optical fibre 2 acts as a partial reflector. The light $L_1$ reflected from the end 6 of the optical fibre 2 can be represented as $L_1 = A \cos(\omega t)$.

Light $L_2$ which passes through the partial reflector 6 to the surface of the vibrating element 4, reflects therefrom and returns to the optical fibre 2, travels an extra distance 2d and furthermore may undergo an arbitrary phase change at reflection from the vibrating element 4. The light $L_2$ that has returned to the end 6 of the optical fibre 2 can be represented by $$L_2 = \beta \cos\left(\omega t + \frac{4\pi d}{\lambda} + \phi\right) \quad \text{(eqn 1)}$$

where $\lambda$ represents the wavelength of the substantially monochromatic light used to illuminate the vibrating element 4, and $\phi$ represents the arbitrary phase change at reflection from the vibrating element 4.

The lights $L_1$ and $L_2$ are coherent with each other and undergo coherent interference. Consequently the intensity of the light returning along the optical fibre 2 is a function solely of the phase difference between the first and second lights. The phase difference $\Phi$: between the first light $L_1$ and the second $L_2$ is $$\Phi = \frac{2\pi \cdot 2d}{\lambda} + \phi \quad \text{(eqn 2)}$$

The intensity of the light returning along the optical fibre 2 is a maximum when $2d = n\lambda$, and a minimum when $2d = (n+\frac{1}{2})\lambda$, where n is an integer.

A major problem of this type of vibrating element sensor is that the amplitude of vibration of the element is typically 50 nanometres but the element 4 may undergo translational motion of 5 or so micrometers due to distortion of the diaphragm 8. The vibration of the resonant element 4 phase modulates the light $L_2$ and thereby causes an intensity variation of the light returning along the optical fibre 2. However, if the mean (i.e. non-vibrating) position of the element 4 is such that the average value of 2d is close to $(n+\frac{1}{2})\lambda$, then the vibration of the element 4 will cause little or no change in the amplitude of the light returning along the optical fibre 2. Similarly, vibration of the element 4 will cause little or no change to the intensity of the light returning along the optical fibre when the phase change $2d=n\lambda$. Thus such a sensor is prone to signal fading as the vibrating element 4 undergoes translation motion in response to distortion of the diaphragm 8 supporting it.

GB 2 239 520 attempts to overcome this problem by illuminating the element 4 with, effectively, two different monochromatic wavelengths which are chosen such that signal fading of one wavelength does not coincide with the signal fading of the other wavelength over the operating range of the resonant sensor. This arrangement requires the use of narrow band filters or two high intensity monochromatic light sources of different, but similar, wavelengths.

According to the invention, there is provided a measuring apparatus as defined in the appended claim 1.

Preferred embodiments of the invention are defined in the other appended claims.

The applicants have realised that the signal fading problem exists because the light reflected from the partial reflector 6 and from the vibrating element 4 is coherent and can undergo coherent interference. However, it has been realised that an improved sensing system can be achieved if the light reflected from the partial reflector 6 and the light reflected from the vibrating element 4 are incoherent with respect to each other and therefore effectively do not undergo mutual coherent interference. In order to achieve this, the distance d between the vibrating element 4 and the partial reflector 6 must always be greater than half the coherence length of the light used to illuminate the resonant sensor.

It is possible to provide an optical signal retrieval apparatus for use with a measurement apparatus in which radiation from an optical source reaches the retrieval apparatus via a first measurement apparatus optical path containing a reference reflector and via a second measurement apparatus optical path containing a vibrating sensing element, the first and second measurement apparatus optical paths being of different lengths, the path length difference being greater than the coherence length of the optical radiation, in which the signal retrieval apparatus comprises at least a first interferometer having first and second interferometer optical paths and a first path length adjusting means arranged to compensate for the path difference between the first and second measurement apparatus optical paths such that a portion of the optical radiation received from the measurement apparatus is able to undergo mutual coherent interference.

It is thus possible to compensate for the difference in the path lengths within the measurement apparatus such that a portion of the light from the two paths therein is brought within the coherence length of the light and can undergo interference. The term "light" as used herein is to be construed in an extended sense to include infra-red and ultra-violet radiation as well as the visible part of the electromagnetic spectrum.

Preferably the measurement apparatus comprises a vibratable element mounted on a diaphragm. Such an arrangement has been briefly described hereinabove. In such an arrangement in which the end of the optical fibre acts as the reference reflector, the requirement that the path length difference is greater than the coherence length of the light used means that the distance between the end of the optical fibre and the surface of the vibrating element must, in use, be more than half of the coherence length of the radiation. In theory there is no constraint on the maximum distance between th e end of the optical fibre and vibrating element, although in practice increasing the gap leads to less light being returned to the fibre and consequently a loss in sensitivity.

Advantageously, the translational movement of the vibrating element is limited such that the element is constrained to lie between first and second sensing element positions. Advantageously the first path length adjusting means is arranged to provide path length compensation substantially equal to the path length from the reference reflector to the average of the first and second sensing element positions and back to the reference reflector. However quite significant deviations in the path length compensation can be tolerated.

As noted above, the vibrating element may be expected to undergo translational motion of 5 micrometers. Suppose that the distance from the end of the optical fibre to the mean translational position of the vibrating element is typically 100 microns and that the coherence length of the optical radiation is 50 microns. In such an arrangement, the first path length adjusting means ought to provide a path length correction of 200 microns so as to bring photons of light reflected from the reference reflector into coherence with photons reflected from the vibrating element. However, it is apparent that partial alignment can be achieved with a path length correction in the range of 150 to 250 microns. Thus, ignoring translational motion of the diaphragm, and defining the vibrating element to have a mean translational position midway between the first and second element positions, the first path length adjusting means is arranged to supply a path length correction less than the sum of twice the distance from the end of the optical fibre to the mean translational position and the coherence length, and more than twice the distance from the end of the optical fibre to the mean translational position minus the coherence length. Allowing for translational motion of the vibrating element moves each of the limits of the path length correction towards one another by an amount equal to distance between the first and second sensing element positions. Thus, taking the above numerical example, the first path length adjusting means must provide a path length correction between 155 and 245 microns. The coherent portions of light can then undergo coherent interference to produce an output light whose intensity is a function of the position of the vibrating element 4.

Advantageously the ratio of light directed along the first and second interferometer optical paths can be adjusted to compensate for differing reflectivities at the reference reflector and the vibrating element.

Preferably the signal retrieval apparatus further comprises a second interferometer comprising a second path length adjusting means which, in use, applies a path length correction which differs from that applied by the first path length adjusting means by $(2n+1)\lambda/4$, where n is an integer ($\ldots -3, -2, -1, 0, 1, 2, \ldots$) and $\lambda$ is a wavelength of a substantially monochromatic light used to illuminate the reference reflector 6 and the vibrating element 4.

Preferably the second interferometer comprises third and fourth interferometer paths. Preferably a path length difference between the third and fourth interferometer paths is equal to the path length difference between the first and second interferometer paths of the first interferometer $\pm(2n+1)\lambda/4$.

Preferably each interferometer has two arms and the path length adjusting means may vary the path difference between the arms of the or each interferometer by physically making the arms of different lengths and/or by including material of different refractive index within the arms or portions thereof.

One or more of the arms of the or each interferometer may have an electrically or optically controllable path length adjusting element therein for adjusting the effective length of the arm or arms of the or each interferometer. The adjusting element may comprise an electro-optic material such that the refractive index of the material changes in response to an electric field experienced thereby. Alternatively, the adjusting element may comprise piezo-opto material such that the refractive index of the material changes in response to an optical input. Alternatively the adjusting element may comprise a material whose refractive index varies as a function of the stress experienced by the material and means for applying a variable stress to the material. Advantageously, the material is an electro-strictive material or a piezo-electric material such as zinc oxide, lead zirconate or lead titanate. Alternatively, the stress applied to a material in an arm of an interferometer may be varied by applying local heating to that arm. In a further alternative arrangement, the material forming the arms of the interferometer may comprise a non-linear optical material such as lithium niobate.

An embodiment of the present invention employing only one interferometer may control an electrically controllable adjusting element within one arm of the interferometer so as to search for a best signal strength and to maintain that signal.

An embodiment of the present invention having two interferometers is arranged such that the interferometers work in quadrature (i.e. when one interferometer is at a minimum in its operating characteristic, the other interferometer is at a maximum) such that the signal from the measurement apparatus can always be recovered, for example, by squaring and then adding the outputs of each interferometer.

As a further alternative, an embodiment having two interferometers working in quadrature is provided with electrically controllable path length adjusting means arranged to keep one of the interferometers at a minimum in its response characteristic, thereby ensuring that the other interferometer is working at maximum sensitivity.

As a further alternative the electrically controllable effective path length adjusting means may be arranged to compensate for temperature drifts within the interferometers of an embodiment having two interferometers.

Advantageously the or each interferometer is fabricated as an integrated device. The or each interferometer may be etched into a semiconductor substrate, such as silicon, gallium arsenide or indium phosphide. The or each interferometer may also be fabricated within other semiconductor or insulating materials. A block of material may be etched so as to define grooves representing the optical path within and between each interferometer and the grooves may then have integrated optical waveguides formed therein by known techniques such as flame hydrolysis deposition, chemical vapour deposition and sol-gel technology.

It is also possible to provide a measurement system comprising an optical signal retrieval apparatus cooperating with a measurement apparatus comprising a vibrating element and a reference reflector arranged such that a first light reflected from the vibrating element and a second light reflected from the reference reflector are incoherent with respect to one another and both are directed towards the signal retrieval apparatus.

It is thus possible to provide a signal processing apparatus and a vibrating element sensor in which the problems of signal fading are reduced or eliminated while maintaining the advantages of illuminating the sensor with a substantially monochromatic light source such as a LED. The light source need not be strictly monochromatic but may have a broadened spectral band width, of say 40 nm, or so.

The present invention will further be described, by way of example, with reference to the accompanying drawings, in which:-

Figure 1:
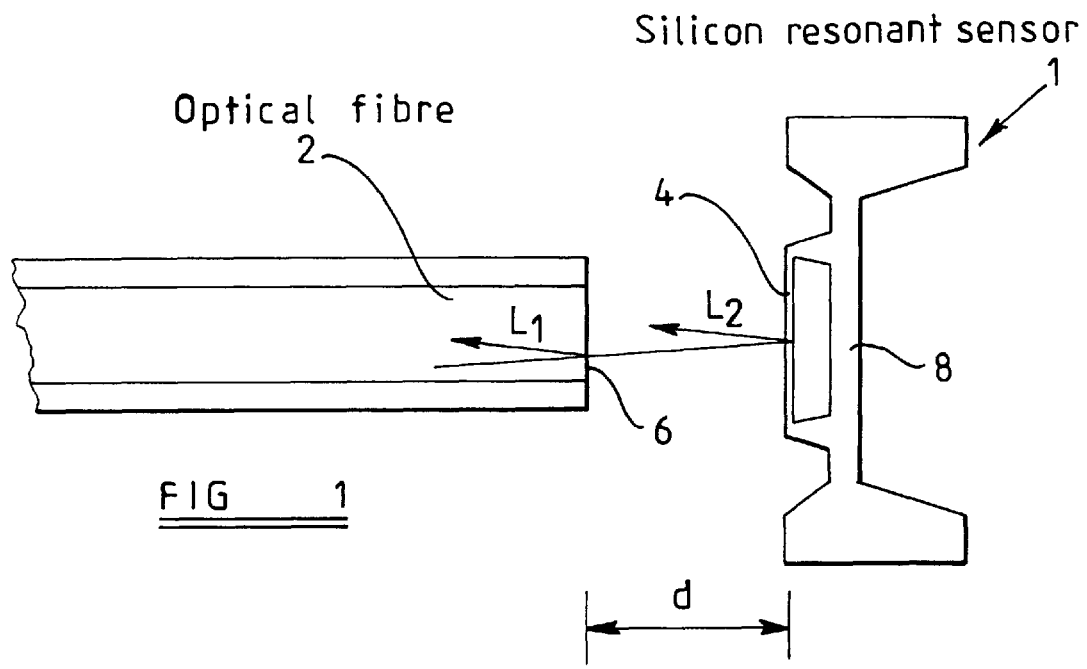
FIG. 1 is a schematic diagram illustrating a vibrating element sensor interrogated by an optical fibre.
Figure 3:
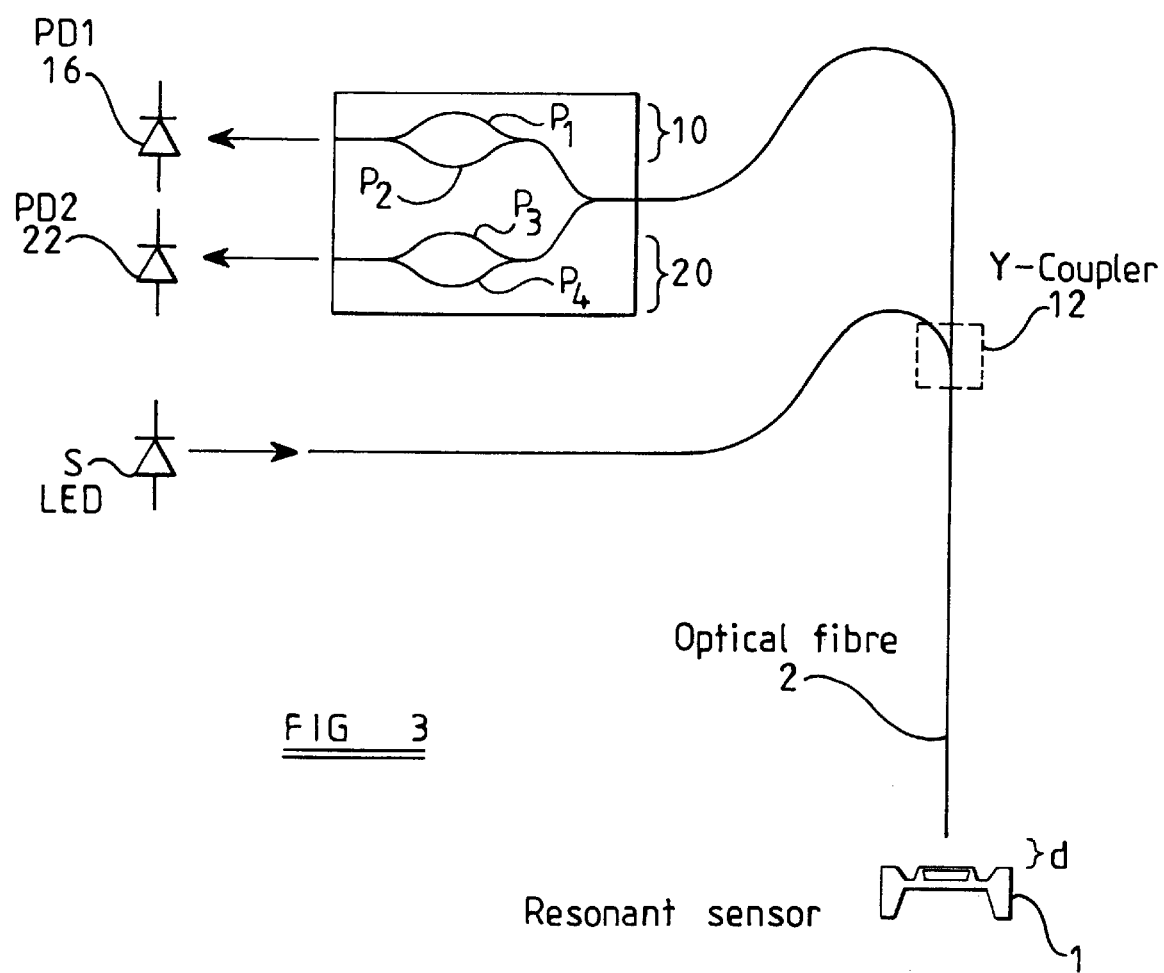
Figure 4:
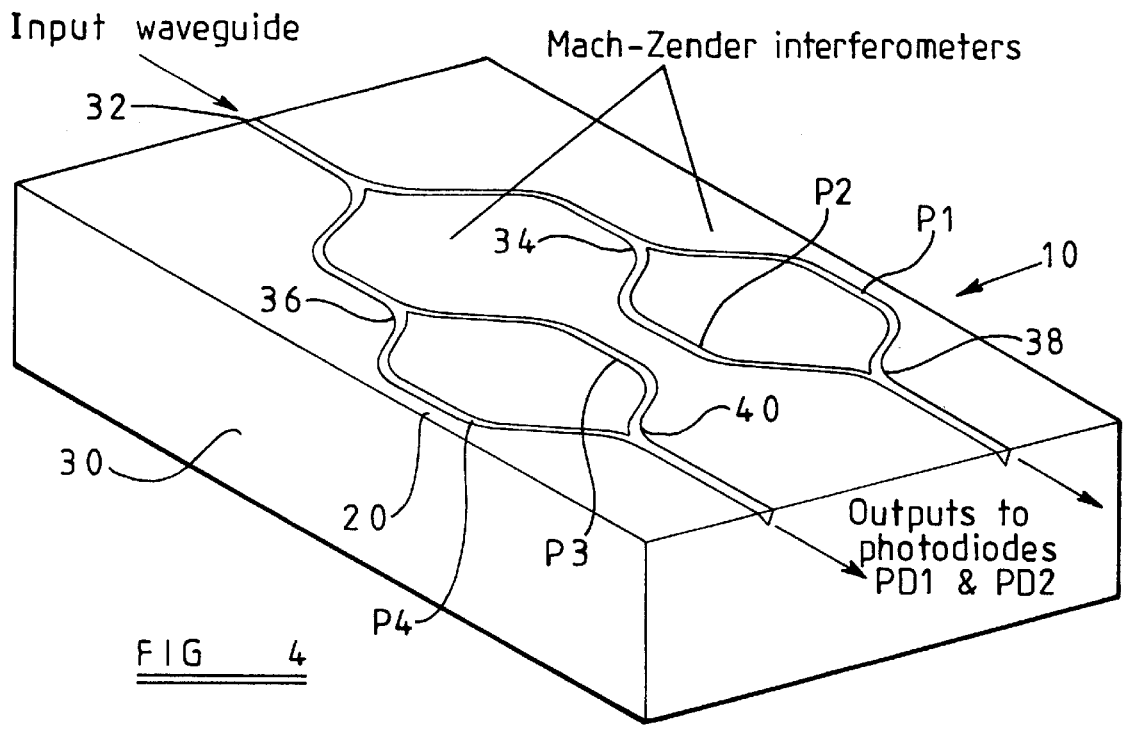
Figure 5:
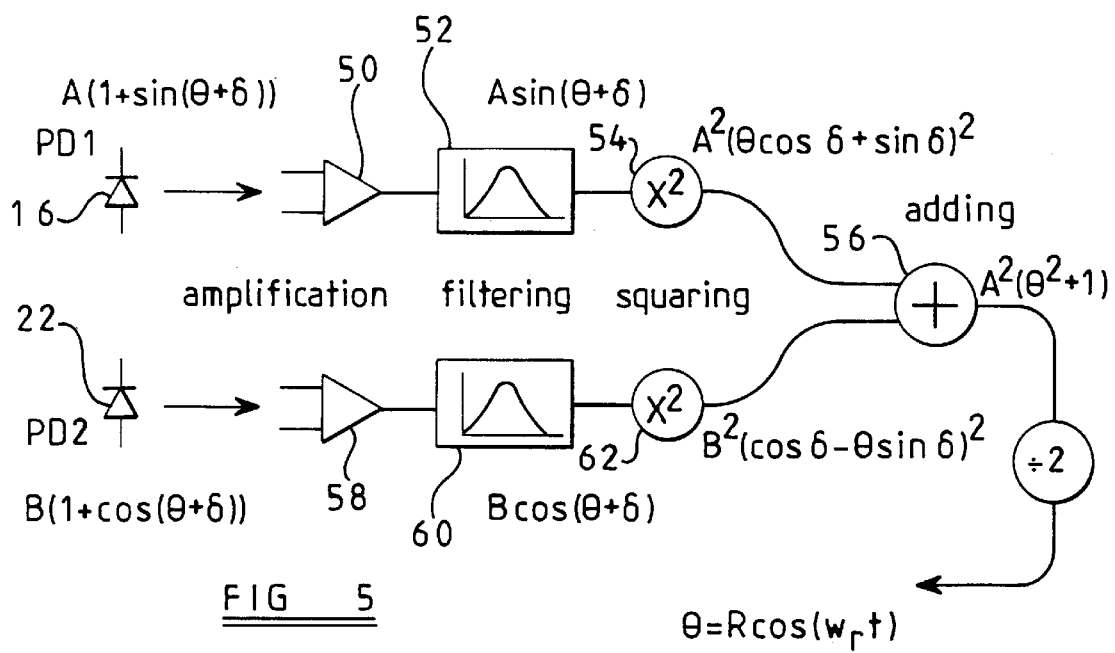
Figure 7:
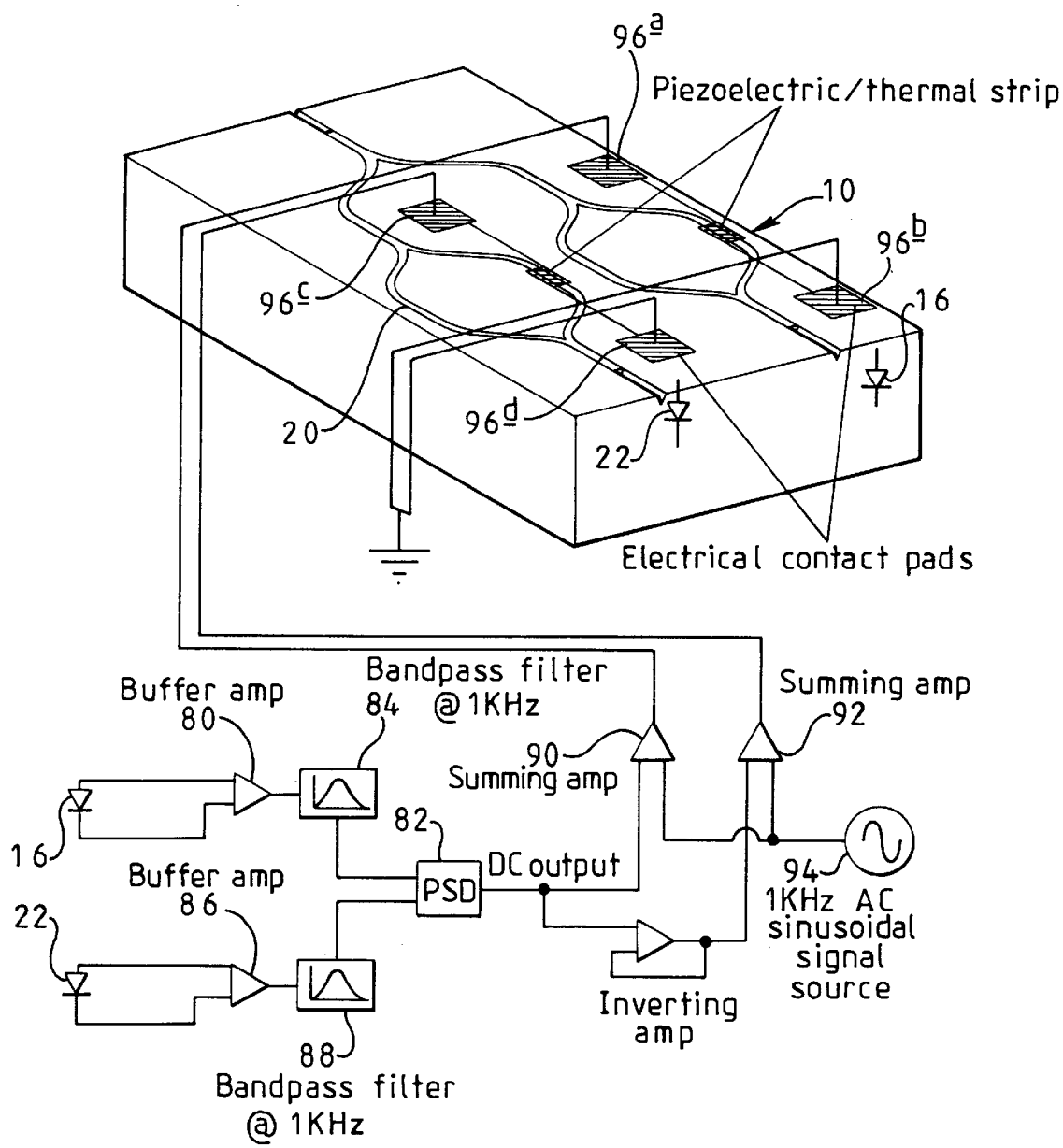

FIG. 3 schematically illustrates the measurement system comprising a sensing element as illustrated in FIG. 1 and a signal retrieval apparatus comprising two interferometers and constituting an embodiment of the present invention;

FIG. 4 is a schematic perspective view of the interferometers shown in FIG. 3;

FIG. 5 is a block diagram of signal processing equipment for processing the signals from the detectors shown in FIG. 3;

FIG. 6 is a perspective schematic diagram illustrating a signal retrieval apparatus constituting a further embodiment of the present invention; and FIG. 7 is a block diagram showing a compensation circuit operating in conjunction with the signal retrieval apparatus of FIG. 6.

As discussed hereinabove, FIG. 1 schematically illustrates a silicon resonant sensor 1 comprising a diaphragm 8 supporting a vibratable element 4. The element 4 is contained within an evacuated cavity (not shown) and is illuminated by light supplied via an optical fibre 2. The fibre 2 need not directly address the vibrating element 4, but may shine light onto a reflecting surface formed at an angle of 45° to both the end of the fibre and the vibrating element 4. An example of a suitable vibrating element transducer is disclosed in U.S. Pat. No. 5,384,872.

Figure 2:
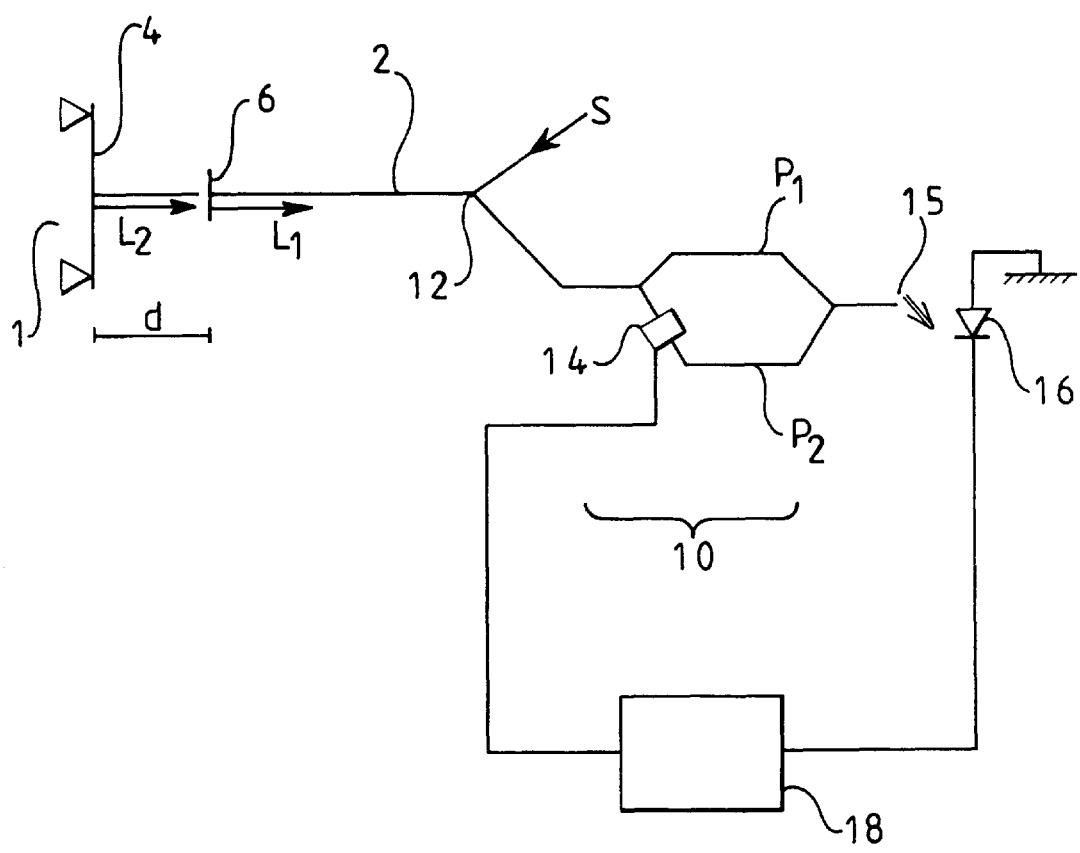
FIG. 2 is a schematic diagram showing the resonant sensor of FIG. 1 in combination with a signal retrieval apparatus having a single interferometer therein and constituting an embodiment of the present invention.

The principle of operation will now be described with reference to FIG. 2. A source S of substantially monochromatic light illuminates the vibrating element 4 and the partial reflector 6 via an optical fibre 2. Light returning from the vibrating element 4 and the partial reflector 6 is directed towards an interferometer 10 via a coupler 12. The interferometer 10 comprises a first interferometer optical path $P_1$ and a second interferometer optical path $P_2$.

In general terms, a first portion $L_1$ of the light is reflected from the partial reflector 6 and a second portion $L_2$ of the light is reflected from the vibrating element 4. The second portion of light $L_2$ travels a further distance 2d compared to the first portion of light $L_1$. The light $L_1+L_2$ arriving at the interferometer 10 is split between the first and second interferometer paths $P_1$ and $P_2$. In an ideal arrangement, the length of the second interferometer optical path $P_2$ is equal to $P_1+2d$. Light arriving at the output 15 of the interferometer 10 can have any one of four effective path lengths, these are:

PL1, for light reflected from the partial reflector 6 and travelling to the output of the interferometer via path $P_1$;

PL2, this corresponds to light reflected from the partial reflector 6 and travelling to the output of the interferometer via the path $P_2$, thus PL2=PL1+2d;

PL3, is the path length for light reflected from the vibrating element 4 and travelling to the output of the interferometer via the path $P_1$, thus PL3=PL1+2d; and PL4, represents the path length for light reflected from the vibrating element 4 and travelling to the output of the interferometer 10 via the path $P_2$, therefore PL4=PL1+4d.

Of these four optical paths, paths PL2 and PL3 are substantially the same length and therefore the portions of light which have travelled these respective paths can undergo mutual coherent interference. However, the other pairs of path lengths, i.e. PL1 and PL3, PL1 and PL4, and PL2 and PL4, differ by 2d or more. Since 2d is a distance greater than the coherence length of the light from the source S, the light travelling via the above paths is not coherent at the output of the interferometer 10 and consequently does not undergo coherent interference. This light contributes to a general background level upon which an amiplitude modulated signal representing the vibration of the vibrating element 4 is superimposed. The vibration of the vibrating element phase modulates light travelling via PL3 with respect to light travelling via PL2, so that the intensity of the radiation after interference varies with the vibration of the element 4.

Since only portions of light travelling via PL2 and PL3 are of use, the interferometer can be tailored to compensate for different reflectivities at the partial reflector 6 and the vibrating element 4. Suppose losses at reflection from the vibrating element were such that 80% of the light reaching the interferometer 10 was received from the partial reflector 6 whereas only 20% of the light came from the vibrating element 4. If the interferometer 10 was manufactured such that 20% of the light was directed along the first interferometer optical path $P_1$ and 80% along the second interferometer optical path $P_2$, then the proportion of the light that travels PL2 is 0.8×0.2=16% and the proportion of light that travels path PL3 is 0.2×0.8=16%. Thus the interfering lights are of equal intensity thereby giving rise to a relatively good change in intensity due to interference. If such a correction was not made and the light was split equally between the first and second interferometer optical paths, 0.8×0.5=40% of the light would travel via PL2 and 0.2×0.5=10% of the light would travel via PL3. Since one path has a much greater intensity than the other path, a relatively weak interference would result.

Although the portions of light having effective path lengths PL2 and PL3 have been path length corrected so as to be able to undergo coherent interference, there is, as yet, no guarantee that the interference will give rise to a signal suitable for detecting motion of the vibrating element 4. In order to achieve maximum sensitivity, the path lengths PL2 and PL3 should differ by $(2n+1)\lambda/4$. In order to achieve this, an electrically controllable path length adjusting element 14 can be inserted in one of the interferometer paths $P_1$ and $P_2$. The effective path length adjusting element 14 need only be able to produce a path length change of $\lambda/4$ in order to guarantee that the maximum sensitivity can be achieved. A photodetector 16 receives the output of the interferometer and supplies a signal to a controller 18. The controller 18 is arranged to control the path length change introduced by the electrically controllable path length adjuster 14 so as to maintain the interferometer 10 at a condition where motion of the vibrating element 4 can be readily detected. The controller 18 may be arranged to dither the control signal to the path length adjuster 14 in order to determine how the amplitude of the interference varies as a function of the signal applied to the effective path length adjusting means 14, and can thereby control the interferometer for maximum sensitivity.

Such an arrangement may not respond quickly enough to rapid motion of the diaphragm 8, and may result in periods where the signal fades before the controller 18 is able to re-establish a suitable path length within the path length adjusting means 14.

Such problems can be overcome by using two interferometers arranged in quadrature, as shown in FIG. 3. The arrangement shown in FIG. 3 is similar to that shown in FIG. 2 except that there are two interferometers, 10 and 20 optically in parallel. The second interferometer 20 comprises a third interferometer optical path and a fourth interferometer optical path. The length of the third interferometer optical path is equal to the length of the first interferometer optical path and the length of the fourth interferometer optical path differs from the length of the second interferometer optical path by $\lambda/4$ (although in general this can be $(2n+1)\lambda/4$ where n is an integer) where $\lambda$ is the wavelength of the monochromatic optical radiation emitted by the source S. In this embodiment, neither interferometer 10 or 20 has an electrically controllable effective path length adjusting means in either of its optical paths. The action of the second interferometer 20 is as described with reference to the first interferometer 10. However, the change in the path length of the fourth optical path $P_4$ by $\lambda/4$ compared to the second interferometer optical path $P_2$ means that the interferometers act in quadrature and that irrespective of the position of the diaphragm 8, at least one of the interferometers 10 and 20 will be able to resolve a signal indicative of the vibration of the element 4. The output of the first interferometer 10 is monitored by a first photodetector 16, whereas the output of the second interferometer 20 is monitored by a second photodetector 22.

The first and second interferometers 10 and 20 may be formed as integrated components within a chip, as shown FIG. 4. The chip comprises a silicon substrate 30 which has been masked and processed to define a series of waveguides as illustrated in FIG. 4. Although FIG. 4 shows the path lengths from an input portion 32 to the start 34 and 36 of each interferometer 10 and 20 as being identical, this is not in fact necessary. The distances which are critical are the path lengths $P_1$ and $P_2$ from the start 34 of the first interferometer to an output 38 thereof and the path lengths $P_3$ and $P_4$ from the start 36 of the second interferometer to an output 40 thereof. All other lengths within the chip may be freely chosen. Optical waveguides may be formed either on the surface of the substrate or embedded within e.g. V or U shaped grooves in the substrate. Optically transparent materials may be deposited or chemically grown into the appropriate areas in order to form optical waveguides. Materials such as silica, doped silica, silicon oxynitride or other materials with appropriate optical properties can be used. The waveguide may comprise a core and a cladding so as to effectively confine light within the waveguide.

The $\lambda/4$ path difference inserted in one arm of one of the interferometers compared to the other interferometer provides a $\pi/2$ phase difference between the output signals of the first and second interferometers 10 and 20, respectively. The output signal $O_1$ from the first interferometer 10 can be represented as:

$$O_1 = A(1 + \sin(\theta + \delta)) \quad \text{(eqn 3)}$$

where $\theta$ is a time varying function representing the movement of the resonating element with a frequency $\omega_R$, such that $\theta = R \cos(\omega_R t)$, where $R = 4\pi a/\lambda$, and a is the amplitude of vibration of the resonator 4.

$\delta$ represents a phase shift introduced by the rest (non-vibrating) position of the element 4, which changes with distortion of the diaphragm. $\delta$ is defined as:

$$\delta = \frac{4\pi d}{\lambda} \quad \text{(eqn 4)}$$

where d is the distance between the reference reflector 6 and the vibrating element 4, and $\lambda$ is the centre wavelength of the substantially monochromatic light source, such as a LED.

Similarly, the output $O_2$ of the second interferometer can, ignoring any DC components, be represented as:

$$O_2 = B(1 + \cos(\theta + \delta)) \quad \text{(eqn 5)}$$

As $\delta$ varies slowly with position, there will be positions for each interferometer which provide virtually zero sensitivity to the small perturbations of the nominal gap distance d as a result of vibration of the vibrating element 4. However, when one interferometer is at minimum sensitivity, the other interferometer is at maximum sensitivity. The motion of the resonator can be continuously extracted by suitable processing of the output signals of the first and second interferometers. The output $O_1$ of the first interferometer 10 is monitored by a photodetector, converted to an electrical signal, and then passed through a high pass or band pass filter to remove DC components. Thus the modified output $O'_1$ can be represented as:

$$O'_1 = A \sin(\theta + \delta) = A(\sin \theta \cos \delta + \cos \theta \sin \delta). \quad \text{(eqn 6)}$$

Given that the amplitude of vibration of the element 4 is typically around 10 nanometres whereas the source wavelength is typically around 800 nanometres, it is apparent from the definition of $\theta$ that $\theta$ is much less than one and consequently equation 6 can be simplified since $\sin \theta$ tends towards $\theta$, and $\cos \theta$ tends towards 1. Thus:

$$O'_1 = A \sin(\theta + \delta) \approx A(\theta \cos \delta + \sin \delta). \quad \text{(eqn 7)}$$

A similar analysis can be performed in respect of the output of the second interferometer 10 to yield a modified output signal $O'_2$ given by:

$$O'_2 = B \cos(\theta + \delta) \approx B(\cos \delta - \theta \sin \delta). \quad \text{(eqn 8)}$$

If the amplitudes are sufficiently equal such that A approximately equals B, then the outputs of the first and second interferometers can be squared and summed, and then the result simplified, to yield:

$$O_c = A^2(R^2 \cos^2(\omega_R t) + 1). \quad \text{(eqn 9)}$$

Thus the output $O_c$ includes a signal of the form $R^2 \cos^2(\omega_R t)$ which is invariant of the gross or drift position $\delta$ of the diaphragm. FIG. 5 schematically illustrates a processing circuit for performing such a calculation in respect of the outputs of the first and second photodetectors 16 and 22 of the arrangement shown in FIGS. 3 and 4. An output of the first photodetector 16 is supplied to a first amplifier 50. An output of the amplifier 50 is supplied to an input of a band pass filter 52 arranged to pass signals at the expected vibrational frequency of the resonant element 4. An output of the band pass filter 52 is supplied to an input of a squaring element 54, such as a four quadrant multiplier.

An output of the squaring element 54 is provided to a first input of a summer 56. Similarly, an output of the photodetector 22 is processed by a further amplifier 58, a further band pass filter 60 and a further squaring element 62 before being supplied to a second input of the summer 56. The output of the summer 56 contains a term which varies as $\cos^2(\theta_R t)$. Given the standard trigonometric relationship that $\cos 2\phi = 2\cos^2\phi - 1$, it is apparent that the output of the summer 56 contains a term having a frequency twice that of the frequency of vibration of the vibrating element 4. If desired, the output of the summer can be passed through a frequency divide by two in order to extract a signal having the same frequency as that of the resonant element 4.

In an alternative processing arrangement, the output signals of each interferometer may be cross multiplied with their respective time differentiated signals and the resultants summed to give a time differentiated modulation signal $d\theta/dt$. On integration, the modulation signal $\theta = R \cos(\omega_{RT})$ is produced.

FIG. 6 shows a modification to the interferometer arrangement shown in FIG. 4. The interferometer optical paths $P_1$ and $P_3$ have additional path length sections 70 and 72, respectively, formed therein. These additional path length sections are electrically controllable to change the effective path lengths of the first and third interferometer paths $P_1$ and $P_3$, respectively. The sections 70 and 72 may be provided by an electro- strictive, piezo-optic, or a piezoelectric material, such as zinc oxide, lead zirconate or lead titanate. On application of a DC electric field to these sections, they will produce a stress induced path-length change in the portion of the waveguide formed by the section 70 or 72 and thus alter the effective path length in that interferometer arm. Similarly, a heater strip can be deposited over a section of one interferometer arm using, for example, tin oxide to form the strip. By passing a DC current through the strip, a path length change in the waveguide defining the interferometer arm is induced by thermal stress and this also causes a change in the effective path length of that arm.

There is a possibility that the interferometer arrangement fabricated within a chip may suffer from a drift in its operating characteristic due to thermal effects. The drift will manifest itself as a phase change between the two interferometer paths. The provision of the path length adjusting elements 70 and 72 enables such drifts to be compensated. Such a compensation can be achieved as follows. A low frequency signal (compared to that of the resonating element 4) is applied to the path length adjusting sections 70 and 72 in each of the interferometers. Typically the low frequency signal will be a 1 kHz sinusoidal signal. A nominal phase difference of $\pi/2$ radians exists between the signals at the outputs of the first and second interferometers. The result of applying an electrical modulation signal to one arm of an interferometer is to modulate the interferometer's optical output. Thus by applying a 1 kHz sinusoidal signal, the result is a high frequency signal representing the oscillation of the vibrating element 4 contained within a modulating envelope of the 1 kHz signal. Since the interferometers operate in quadrature, the phase of the modulating envelopes of the optical output signals are out of phase with respect to one another by $\pi/2$ radians.

After optical to electrical conversion via the photodetectors 16 and 22, a portion of the electrical signals may be tapped-off, fed into band pass filters centred at 1 kHz and then fed to a phase detection circuit, such as a phase sensitive detector PSD. The PSD produces an output signal which is proportional to the difference in phase between the two 1 kHz modulation signals. So long as there is no drift between the optical path lengths of the two interferometers 10 and 20, the phase difference between the 1 kHz signals from the two interferometers will remain at $\pi/2$ radians.

If for some reason, such as thermal fluctuation, the interferometers cease to be in quadrature, the phase difference between the 1 kHz signals will vary and consequently the output of the PSD will also vary. The PSD output signal can be conditioned to provide a DC voltage which varies linearly with the changes in phase. This DC signal can then be applied as a correcting signal to either or both of the additional path length correcting elements 70 and 72. When applying a DC signal to both elements 70 and 72, the DC signal applied to each element should be equal in magnitude but opposite in sign.

By applying AC and DC signals simultaneously to the path length correcting elements 70 and 72 of each of the interferometers 10 and 20, closed loop control of the relative phase difference between the outputs of the interferometers can be maintained. Signal retrieval of the vibrating element resonance frequency, which is typically 100 or 200 kHz, will not be affected by the use of this technique as the filtering stage to remove the DC components can also be designed to remove the 1 kHz signals.

FIG. 7 schematically illustrates an apparatus for controlling the interferometer arrangement of FIG. 6 to maintain the first and second interferometers in quadrature. Light at the output of the first interferometer 10 is converted to an electrical signal by a first photodetector 16. The output of the photodetector 16 is amplified by a first buffer amplifier 80. The output of the first buffer amplifier 80 is supplied to a first input of a phase sensitive detector 82 via a 1 kHz band pass filter 84. Similarly light at the output of the second interferometer 20 is converted into an electrical signal by a second photodetector 22. An output of the second photodetector 22 is supplied to a second buffer amplifier 86. An output of the second buffer amplifier 86 is supplied to a second input of the phase sensitive detector 82 via a second band pass filter 88. An output of the phase sensitive detector 82 is supplied to a first input of a first summing amplifier 90, and is inverted and applied to a first summing input of a second summing amplifier 92. Second summing inputs of the first and second summing amplifiers 90 and 92 receive a common signal from a signal generator 94. An output of the first summing amplifier 90 is used to control the first path length adjusting element 70, where as an output of the second summing amplifier 92 is used to control the second path length adjusting element 72. Electrical connections with the elements 70 and 72 are made via bonding pads 96a to 96d formed on the surface of the substrate 30.

Another method for compensating for path length drift due to temperature variations is to deposit materials over the waveguide which produce an opposite effect to that of the temperature alone. Thus as the path lengths drift with temperature, a section of the waveguide undergoes a path length change which opposes the temperature drift and thus produces a cancelling effect.

As shown in FIG. 6 the chip carrying the first and second interferometers 10 and 20 may include optical fibre alignment grooves 100 for holding input and output optical fibres in proper alignment with the integrated optic waveguides 102 which form the interferometers 10 and 20. A section of the integrated optic waveguide is shown in greater detail in the insert in FIG. 6. The integrated optic waveguide comprises a core 110 surrounded by a cladding material 112 which confines light to travel along the core 110.

As noted hereinabove, the interferometers may be formed within a semiconductor substrate such as silicon. Furthermore, the photodetectors and suitable processing electronics may also be fabricated on the substrate so as to provide a fully integrated detection system.

Such an arrangement also simplifies the fabrication of the sensor head since the only requirement is that the path difference between the partial reflector 6 and vibrating element 4 is greater than the coherence length of the light used to illuminate the vibrating element 4. It is thus possible to provide a reliable detection system and a vibrating element transducer arrangement including such a detection system in which signal fading does not occur.

It is claimed:

1. A measuring apparatus comprising a vibrating element having a vibration frequency representing a parameter to be measured, a reference reflector, a source of optical radiation for luminating said vibrating element in said reference reflector, and a measuring device defining a first optical path having a first optical path length from said source via said reference reflector to said measuring device and a second optical path having a second optical path length form said source via said vibrating element to said measuring device, a difference x between said first and second optical path links being greater than a coherence length of said radiation, in which said measuring device comprises a first photodetector, and a second photodetector, a first interferometer and a second interferometer, the second interferometer operating in quadrature with respect to said first interferometer, and a processing circuit that inputs signal outputs from the first and second photodetector an outputs a signal output representative of the parameter being measured;

wherein the first interferometer has a first arm and a second arm and the second interferometer has a first arm and a second arm, an optical path of the first arm of the first interferometer being substantially equal to an optical path of the first arm of the second interferometer and an optical path of the second arm of the first interferometer differs from an optical path length of the second arm of the second interferometer by $(2n+1)\lambda/4$, where n is an integer and $\lambda$ is the wavelength of radiation, and wherein at least one of said optical paths through the first and second interferometer includes a path length adjuster.

2. An apparatus as claimed in claim 1, in which the processing circuit forms a sum of squares of outputs of said first and second photodetectors.

3. An apparatus as claimed in claim 1, in which the path length adjuster is a first path length adjuster and another one of said optical paths through the first and second interferometers includes a second path length adjuster and said measuring device includes a second controller responsive to said first and second photodetectors for controlling said second path length adjuster.

4. An apparatus as claimed in claim 3, in which said second controller comprises an oscillator for producing an oscillator signal having an oscillator frequency outside an expected range of resonant frequencies of said vibrating element, first and second filters having first and second outputs, respectively, at said oscillator frequency, a phase sensitive detector having inputs connected to said first and second outputs, and a summer for summing a signal from said phase sensitive detector with said oscillator signal.

* * * * *